United States Patent
Kim (10) Patent No.: US 11,745,690 B2
(45) Date of Patent: Sep. 5, 2023

(54) APPARATUS FOR MOUNTING CURTAIN AIRBAG CUSHION

(71) Applicant: HYUNDAI MOBIS CO., LTD., Seoul (KR)

(72) Inventor: Ju Kyung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/659,808

(22) Filed: Apr. 19, 2022

(65) Prior Publication Data

US 2022/0355757 A1    Nov. 10, 2022

(30) Foreign Application Priority Data

May 4, 2021    (KR) .......................... 10-2021-0057568

(51) Int. Cl.
*B60R 21/232* (2011.01)
*B60R 21/201* (2011.01)
*B60R 21/213* (2011.01)

(52) U.S. Cl.
CPC .......... *B60R 21/232* (2013.01); *B60R 21/201* (2013.01); *B60R 21/213* (2013.01)

(58) Field of Classification Search
CPC ..... B60R 21/20; B60R 21/201; B60R 21/213; B60R 21/232
See application file for complete search history.

(56) References Cited

U.S. PATENT DOCUMENTS

| | | | | |
|---|---|---|---|---|
| 7,780,187 B2 * | 8/2010 | Minamikawa | ........ | B60R 21/213 24/458 |
| 7,823,914 B2 * | 11/2010 | Cheal | ............. | B60R 21/213 280/730.2 |
| 7,980,585 B2 * | 7/2011 | Cheal | ............. | B60R 21/201 280/730.2 |
| 8,056,924 B2 * | 11/2011 | Hatfield | ............. | B60R 21/213 280/730.2 |
| 8,091,918 B2 * | 1/2012 | Mitchell | ............. | B60R 21/201 280/730.2 |
| 8,240,701 B2 * | 8/2012 | Cheal | ............. | B60R 21/201 280/730.2 |
| 8,820,779 B1 * | 9/2014 | Low | ............. | B60R 21/232 280/728.2 |
| 9,487,175 B2 * | 11/2016 | Noma | ............. | B60R 21/214 |
| 9,580,036 B2 * | 2/2017 | Choi | ............. | B60R 21/213 |
| 10,005,419 B2 * | 6/2018 | Konaka | ............. | B60R 21/237 |
| 11,220,232 B2 * | 1/2022 | Kim | ............. | B60R 21/217 |
| 2022/0297627 A1 * | 9/2022 | Kim | ............. | B60R 21/213 |
| 2022/0371539 A1 * | 11/2022 | Kim | ............. | B60R 21/213 |

\* cited by examiner

*Primary Examiner* — Laura Freedman
(74) *Attorney, Agent, or Firm* — DLA PIPER LLP (US)

(57) ABSTRACT

An apparatus for mounting a curtain airbag cushion, the apparatus including an intermediate connection tab and a strap sewn onto a curtain airbag cushion, a mounting plate coupled to the intermediate connection tab, and a ramp bracket assembled with the mounting plate and fixedly coupled to a vehicle body together with the mounting plate, in which the mounting plate and the ramp bracket are assembled as a coupling hook of the mounting plate passes through a hook hole of the ramp bracket.

14 Claims, 9 Drawing Sheets

APPARATUS FOR MOUNTING CURTAIN AIRBAG CUSHION

CROSS REFERENCE TO RELATED APPLICATION

The present application claims priority to Korean Patent Application No. 10-2021-0057568, filed May 4, 2021, the entire contents of which is incorporated herein for all purposes by this reference.

BACKGROUND OF THE INVENTION

Field of the Invention

The present invention relates to an apparatus for mounting a curtain airbag cushion, and more particularly, to a technology related to an apparatus for mounting a curtain airbag cushion, which is capable of improving assembly properties and workability and shortening working time at the time of fixing and coupling a folded curtain airbag cushion to a vehicle body.

Description of the Related Art

In general, a vehicle is equipped with various types of airbag devices for protecting passengers in the event of an accident. Among the airbag devices, a curtain airbag device refers to a device mounted in a side panel of a vehicle body and configured to protect the passenger by unfolding and deploying an airbag cushion downward in the event of a vehicle rollover or a broadside collision accident.

A typical curtain airbag device has a folded airbag cushion rolled in a circular shape, and the airbag cushion is fixed to an upper portion of a pillar part of a vehicle body by means of a ramp bracket. The folded airbag cushion is deployed by a pressure of airbag gas produced by an inflator and protects the passenger's upper body including the passenger's head. During a process of deploying the airbag cushion, the ramp bracket serves to guide a direction in which the airbag cushion is deployed, thereby preventing interference between the airbag cushion and vehicle body trim.

Bolts (or screws) are used to fix the ramp bracket, to which the folded airbag cushion is coupled, to a side panel of the vehicle body. A mounting plate made of steel is coupled to a portion where the bolt penetrates the ramp bracket in order to maintain a secure coupling force of the bolt.

In the related art, an operator bends a part of the mounting plate by applying an external force to the mounting plate, and the mounting plate and the ramp bracket are coupled to each other by means of the bent part of the mounting plate. For this reason, assembly properties and workability of the ramp bracket and the mounting plate are degraded, and an excessive amount of working time is required to fix the curtain airbag cushion to the vehicle body.

The foregoing explained as the background is intended merely to aid in the understanding of the background of the present invention, and is not intended to mean that the present invention falls within the purview of the related art that is already known to those skilled in the art.

SUMMARY OF THE INVENTION

The present invention is proposed to solve these problems and aims to provide an apparatus for mounting a curtain airbag cushion, which is used to fix and couple a folded curtain airbag cushion to a vehicle body. An object of the present invention is to provide an apparatus for mounting a curtain airbag cushion, in which a flexible material is connected to a curtain airbag cushion, and a hard rigid material is assembled to a vehicle body, such that damage to the curtain airbag cushion may be prevented, assembly torque may be maintained at the time of coupling the curtain airbag cushion to the vehicle body, and assembly properties and workability may be improved by preventing a sag in the curtain airbag cushion.

Another object of the present invention is to shorten a whole assembly time by improving assembly properties and workability of a ramp bracket and a mounting plate, thereby improving productivity.

To achieve the above-mentioned objects, the present invention provides an apparatus for mounting a curtain airbag cushion, the apparatus including: a ramp bracket into which a folded curtain airbag cushion is inserted; a mounting plate assembled with the ramp bracket and fixedly installed on a vehicle body together with the ramp bracket; an intermediate connection tab coupled to the mounting plate; and a strap configured to surround, in a circumferential direction, the curtain airbag cushion inserted into the ramp bracket, the strap having one end sewn together with the curtain airbag cushion and the intermediate connection tab and the other end connected to the mounting plate and configured to fix the curtain airbag cushion.

The other end of the strap may be connected to the mounting plate as the other end of the strap penetrates the mounting plate and then is fixed by being caught directly by the mounting plate.

A fixing member may be coupled to the other end of the strap, and the other end of the strap may be connected to the mounting plate by means of the fixing member as the fixing member penetrates the mounting plate and then is fixed by being caught by the mounting plate.

The ramp bracket and the mounting plate may be fixedly installed on the vehicle body as a bolt integrally penetrating the ramp bracket and the mounting plate is coupled to the vehicle body, and the mounting plate may be made of steel so that the mounting plate is prevented from being sagged by loads by the intermediate connection tab, the strap, and the curtain airbag cushion.

The mounting plate may have a first through-hole through which the strap passes, and a second through-hole through which the intermediate connection tab passes, and the first and second through-holes may be spaced apart from each other in an upward/downward direction.

The intermediate connection tab may be made of a flexible fabric, two opposite ends of the intermediate connection tab may overlap each other after the intermediate connection tab passes through the second through-hole of the mounting plate, and a portion of the intermediate connection tab, which is positioned below the second through-hole, may be sewn together with the curtain airbag cushion and one end of the strap.

The strap may be made of a flexible fabric, one end of the strap may be inserted between the curtain airbag cushion and the intermediate connection tab and sewn together with the curtain airbag cushion and the intermediate connection tab, and the other end of the strap may surround the curtain airbag cushion in the circumferential direction and then pass through the first through-hole of the mounting plate.

Catching portions may be provided at two opposite sides of a lower end of the mounting plate, a catching hole may be formed at the other end of the strap so that the catching portions pass through the catching hole and are caught by the catching hole, and the other end of the strap may be fixed by being caught directly by the mounting plate as the catching portions are fixed to the catching hole.

The fixing member may be coupled to the strap so that two opposite ends of the fixing member protrude from two opposite sides of the strap, and the fixing member may penetrate the mounting plate and then be fixed as the two opposite ends of the fixing member are caught by a rear surface of the mounting plate.

The fixing member may be made of any one steel and plastic having rigidity so that the fixing member is fixed by being caught by the rear surface of the mounting plate after penetrating the mounting plate.

A coupling hook may be formed integrally with the mounting plate and protrude toward the ramp bracket, the ramp bracket may have a hook hole through which the coupling hook passes, and the ramp bracket and the mounting plate may be assembled to each other as the coupling hook having passed through the hook hole is fixed by being caught by a rear surface of the ramp bracket.

A length of the coupling hook based on an upward/downward direction may be longer in dimension than a length of the hook hole based on the upward/downward direction so that the coupling hook having passed through the hook hole is fixed by being caught by the rear surface of the ramp bracket.

The coupling hook may protrude from each of two opposite lateral surfaces of the mounting plate, and an anti-rotation protrusion formed on the ramp bracket may come into contact with an upper surface of the mounting plate when the ramp bracket and the mounting plate are assembled, such that a rotation of the mounting plate is prevented as the anti-rotation protrusion comes into contact with the mounting plate.

The coupling hook may protrude from an upper surface of the mounting plate, and anti-rotation protrusions formed on the ramp bracket may come into contact with two opposite surfaces of the mounting plate when the ramp bracket and the mounting plate are assembled, such that a rotation of the mounting plate is prevented as the anti-rotation protrusions come into contact with the mounting plate.

The apparatus for mounting a curtain airbag cushion according to the present invention includes the intermediate connection tab and the strap sewn onto the curtain airbag cushion, the mounting plate coupled to the intermediate connection tab, and the ramp bracket assembled with the mounting plate and fixedly coupled to the vehicle body together with the mounting plate. Further, since the mounting plate is made of steel, sufficient assembly torque may be maintained when the mounting plate is fixedly assembled to the vehicle body by means of the bolt, a fastening force between the mounting plate and the vehicle body may be increased, thereby preventing the curtain airbag cushion from separating from the vehicle body.

In addition, according to the present invention, since the mounting plate is made of steel, the mounting plate may be prevented from being sagged by the loads of the intermediate connection tab, the strap, and the curtain airbag cushion. Therefore, the shape of the mounting plate may be maintained, which makes it possible to improve assembly properties and workability when the operator assembles the mounting plate to the vehicle body by using the bolt.

In addition, according to the present invention, the intermediate connection tab and the strap are made of a flexible fabric so that the intermediate connection tab and the strap are sewn onto the curtain airbag cushion. Therefore, it is possible to prevent damage to the curtain airbag cushion caused by the intermediate connection tab and the strap when the intermediate connection tab and the strap are sewn onto the curtain airbag cushion.

In addition, according to the present invention, the mounting plate and the ramp bracket are assembled as the coupling hook of the mounting plate passes through the hook hole of the ramp bracket. Therefore, it is possible to improve assembly properties and workability of the mounting plate and the ramp bracket and shorten a whole assembly time, thereby improving productivity.

DETAILED DESCRIPTION OF THE INVENTION

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used only for the purpose of describing particular embodiments and are not intended to limit the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present specification.

A control unit (controller) according to an exemplary embodiment of the present invention may be implemented by a non-volatile memory (not illustrated) configured to algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Hereinafter, an apparatus for mounting a curtain airbag cushion according to an exemplary embodiment of the present invention will be described with reference to the accompanying drawings.

A curtain airbag device for a vehicle includes an inflator configured to produce airbag gas, and a curtain airbag cushion configured to be deployed by receiving the airbag gas.

The inflator and the curtain airbag cushion are installed to be positioned on a vehicle body at an upper side of a vehicle pillar part. When the curtain airbag cushion operates, the curtain airbag cushion is unfolded and deployed downward and protects a passenger.

The mounting apparatus according to the present invention is used to fix and install the curtain airbag cushion to the vehicle body at the upper side of the vehicle pillar part.

That is, as illustrated in FIGS. 1 to 9, the apparatus for mounting a curtain airbag cushion according to the present invention includes: a ramp bracket 600 into which a folded curtain airbag cushion 1 rolled in a circular shape is inserted; mounting plates 100 assembled to the ramp bracket 600 and fixedly installed on a vehicle body 2 together with the ramp bracket 600; intermediate connection tabs 200 coupled to the mounting plates 100; and straps 400 configured to surround, in a circumferential direction, the curtain airbag cushion 1 inserted into the ramp bracket 600, the straps 400 each having one end coupled and sewn 300 together with the curtain airbag cushion 1 and the intermediate connection tab 200, and the other end connected to the mounting plate 100 and configured to fix the curtain airbag cushion 1.

Figure 1:
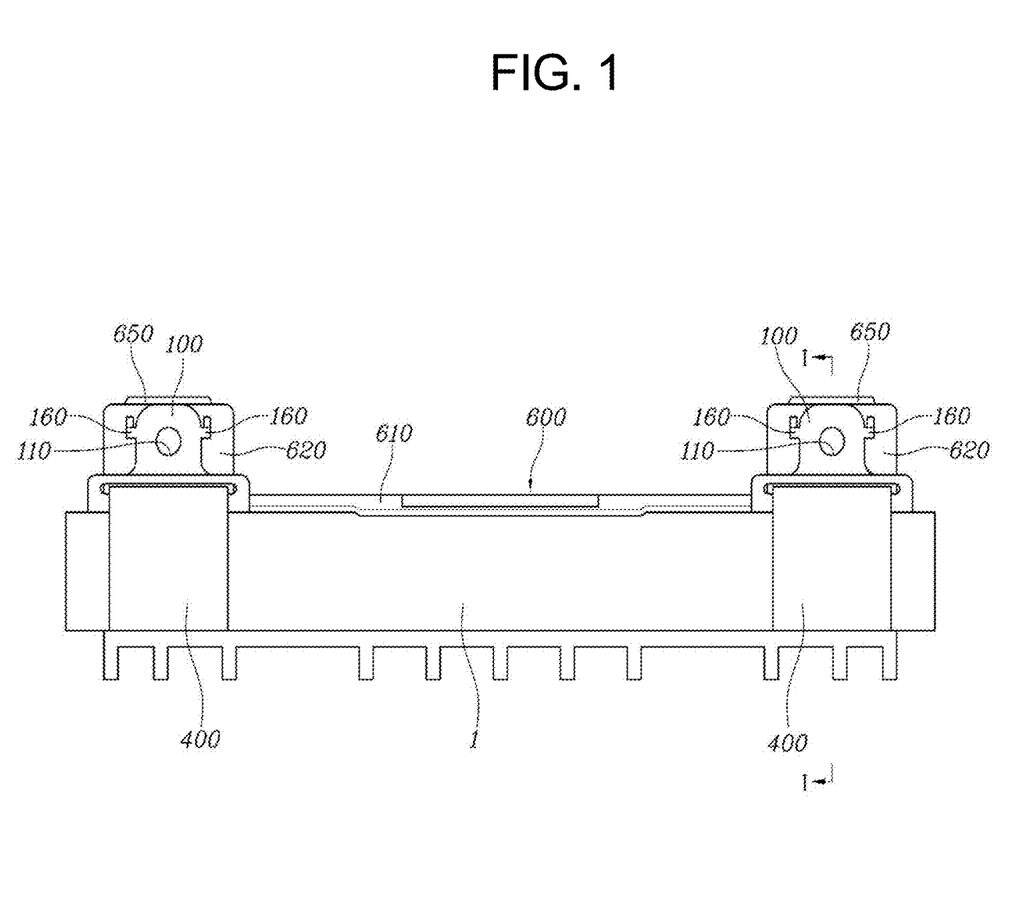
FIG. 1 is a front view illustrating a state in which a folded curtain airbag cushion is fixed by an apparatus for mounting a curtain airbag cushion according to the present invention.
Figure 2:
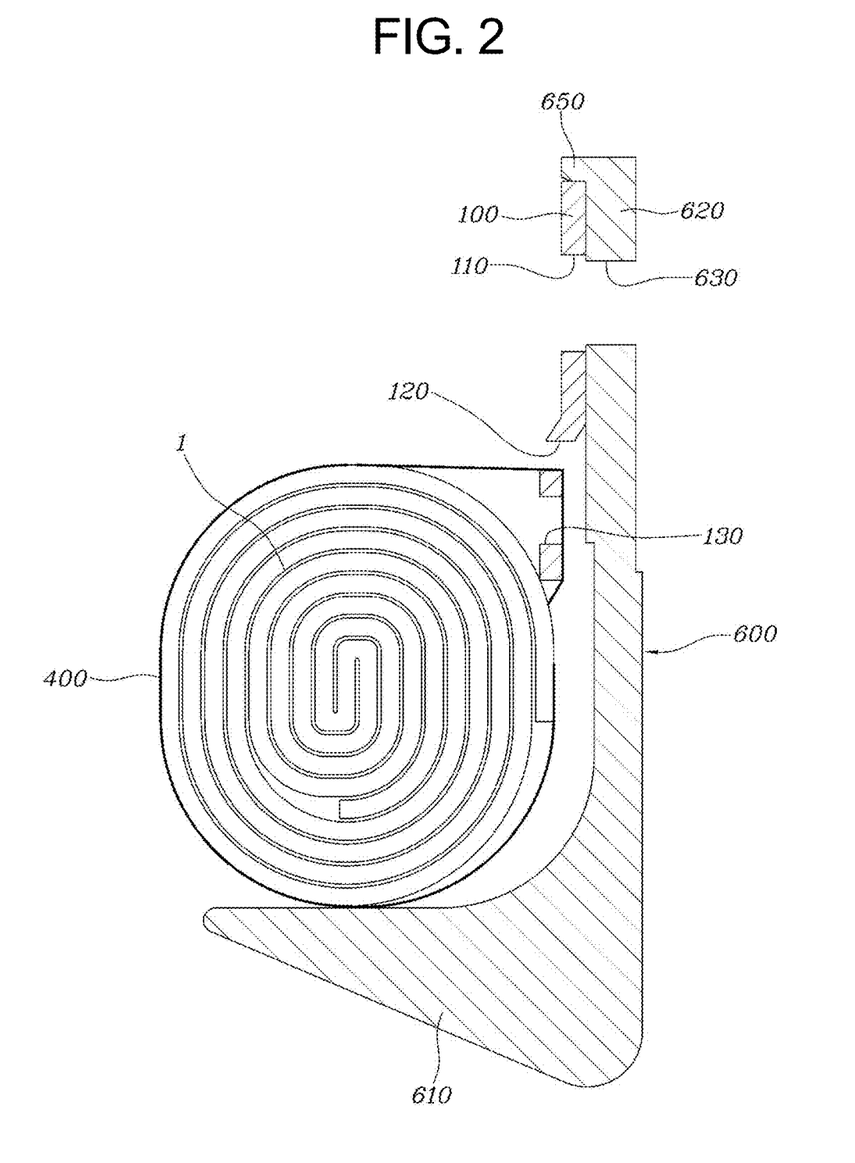
FIG. 2 is a cross-sectional view taken along line I-I in FIG. 1.
Figure 3:
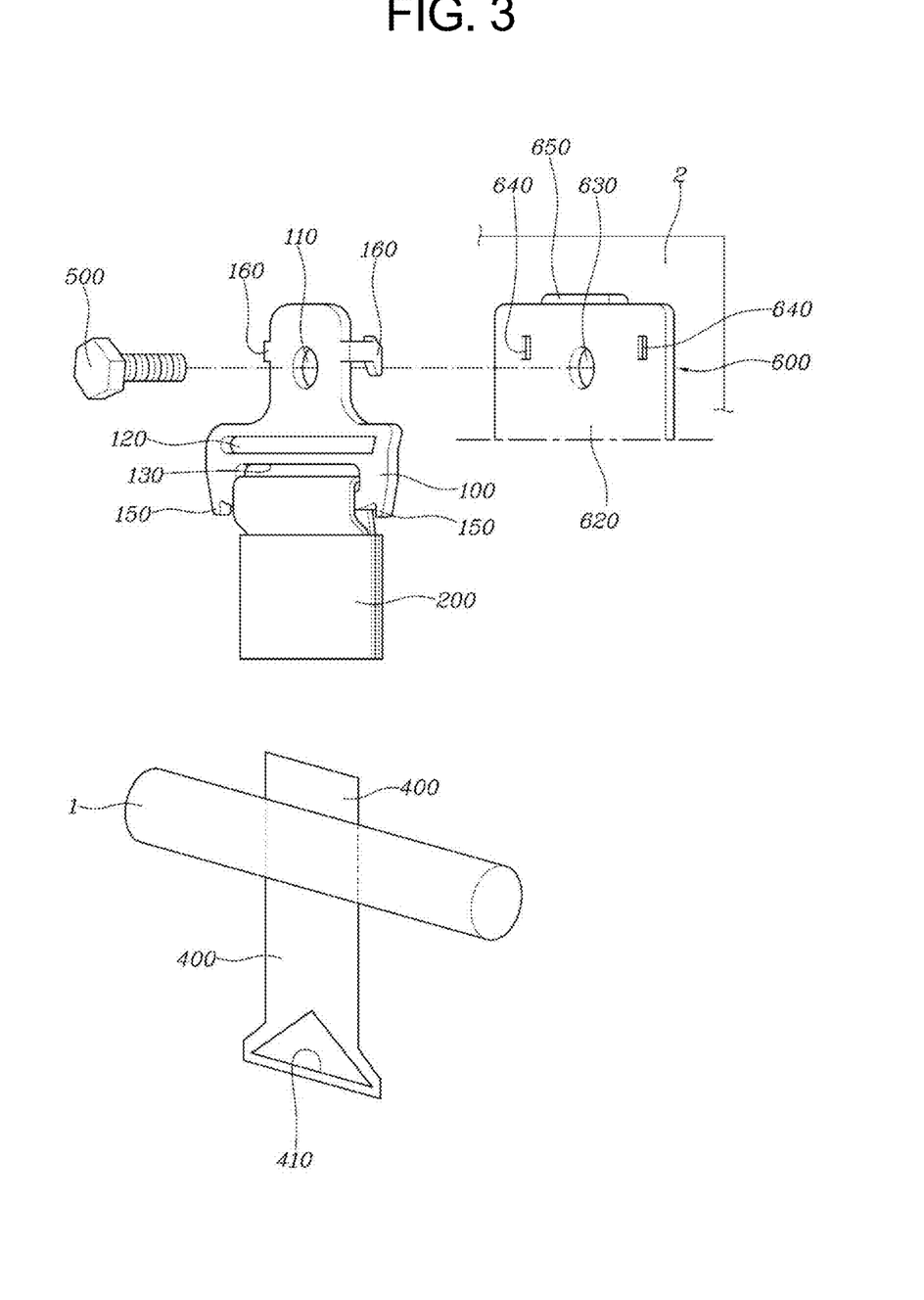
FIG. 3 is an exploded view of the apparatus for mounting a curtain airbag cushion according to the present invention.

The ramp bracket 600 includes a body part 610 having a hemispheric arc shape, and coupling parts 620 connected to the body part 610.

The folded curtain airbag cushion 1 rolled in a circular shape is inserted into the body part 610 of the ramp bracket 600. The coupling part 620 protrudes from the body part 610 and is fixedly installed on the vehicle body 2 together with the mounting plate 100 by means of a bolt 500.

The mounting plate 100 is positioned on a front surface of the ramp bracket 600, and the bolt 500 penetrates the mounting plate 100 and the ramp bracket 600 and then is coupled to the vehicle body 2. To this end, bolt holes 110 and 630 are respectively formed in the ramp bracket 600 and an upper end of the mounting plate 100 so that the bolt 500 penetrates the bolt holes 110 and 630.

The mounting plate 100 may be made of steel so as to be prevented from being sagged by loads of the intermediate connection tab 200, the strap 400, and the curtain airbag cushion 1.

In the case in which the mounting plate 100 is made of steel, sufficient assembly torque may be maintained when the mounting plate 100 is fixedly assembled to the vehicle body 2 by means of the bolt 500. Therefore, a fastening force between the mounting plate 100 and the vehicle body 2 may be increased, thereby preventing the curtain airbag cushion 1 from separating from the vehicle body 2.

In addition, since the mounting plate 100 is made of steel, the mounting plate 100 may be prevented from being sagged by the loads of the intermediate connection tab 200, the strap 400, and the curtain airbag cushion 1. Therefore, the shape of the mounting plate 100 may be maintained, which makes it possible to improve assembly properties and workability when the operator assembles the mounting plate 100 to the vehicle body 2 by using the bolt 500.

According to the present invention, the mounting plate 100 has a first through-hole 120 through which the strap 400 passes, and a second through-hole 130 through which the intermediate connection tab 200 passes. The first and second through-holes 120 and 130 are spaced apart from each other in an upward/downward direction.

As another example, the mounting plate 100 may have a single through-hole through which both the intermediate connection tab 200 and the strap 400 may pass.

The intermediate connection tab 200 is made of a flexible fabric, and two opposite ends of the intermediate connection tab 200 overlap each other after the intermediate connection tab 200 passes through the second through-hole 130 of the mounting plate 100. A portion of the intermediate connection tab 200, which is positioned below the second through-hole 130, is sewn 300 together with the curtain airbag cushion 1 and one end of the strap 400, such that the curtain airbag cushion 1, the intermediate connection tab 200, and the strap 400 are integrally coupled.

The strap 400 is made of a flexible fabric. One end of the strap 400 is inserted between the curtain airbag cushion 1 and the intermediate connection tab 200 and sewn 300 together with the curtain airbag cushion 1 and the intermediate connection tab 200. The other end of the strap 400 surrounds the curtain airbag cushion 1 in the circumferential direction, passes through the first through-hole 120 of the mounting plate 100, and then is connected to the mounting plate 100 to fix the curtain airbag cushion 1.

A selvage portion of the curtain airbag cushion 1, the intermediate connection tab 200, and one end of the strap 400 are integrated by being sewn 300 together. The intermediate connection tab 200 and the strap 400 may be made of a flexible fabric so that the intermediate connection tab 200 and the strap 400 are sewn 300 together.

In addition, since the intermediate connection tab 200 and the strap 400 are made of a flexible fabric, it is possible to prevent damage to the curtain airbag cushion 1 caused by the intermediate connection tab 200 and the strap 400 when the intermediate connection tab 200 and the strap 400 are sewn 300 onto the curtain airbag cushion 1.

As described above, one end of the strap 400 is inserted between the curtain airbag cushion 1 and the intermediate connection tab 200, and the curtain airbag cushion 1, one end of the strap 400, and the intermediate connection tab 200 may be sequentially sewn 300.

As another example, one end of the strap 400 may overlap a rear surface of the intermediate connection tab 200, and the curtain airbag cushion 1, the intermediate connection tab 200, and one end of the strap 400 may be sequentially sewn 300.

Figure 4:
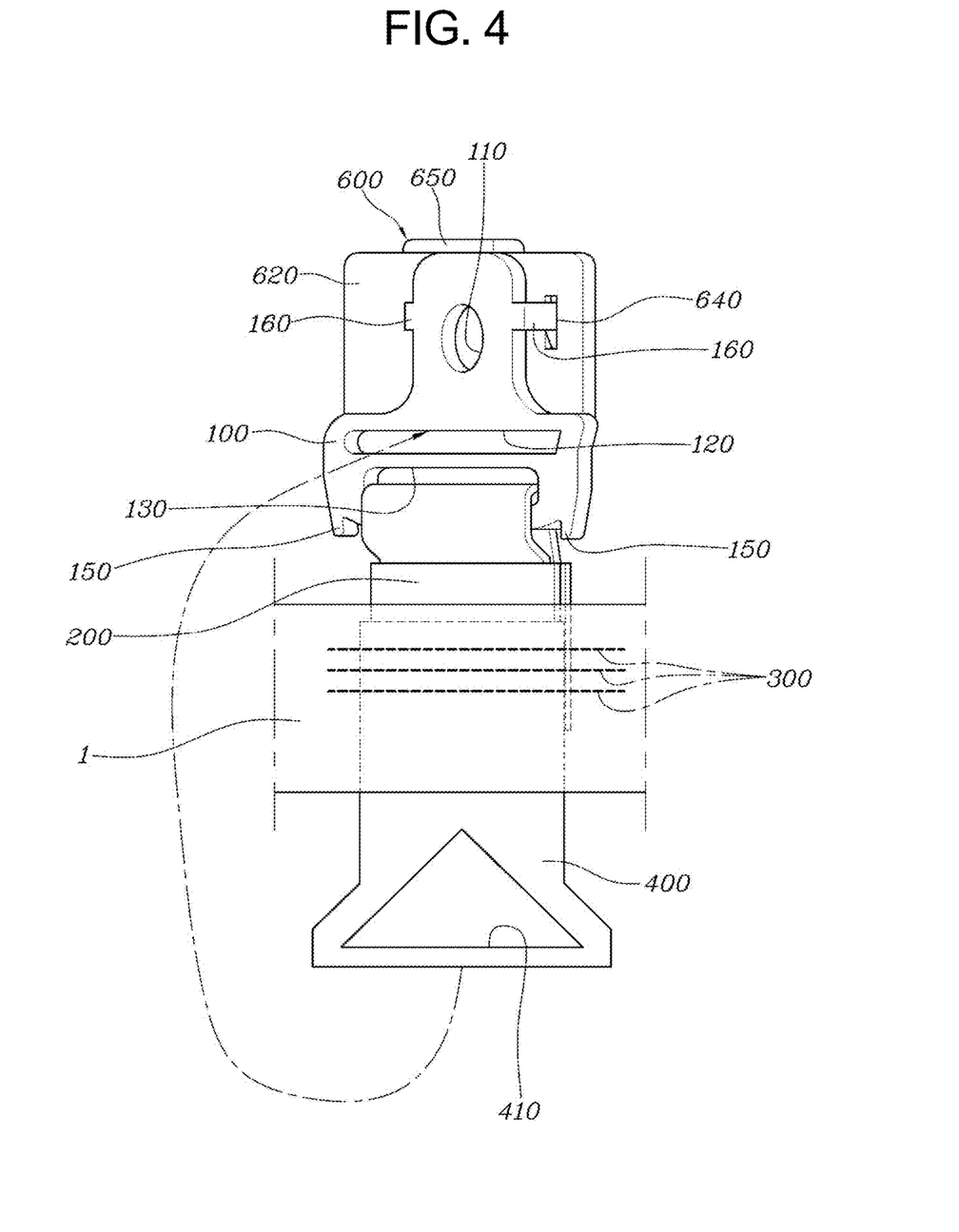
FIG. 4 is a view illustrating a state in which a ramp bracket and a mounting plate illustrated in FIG. 3 are assembled, and the curtain airbag cushion, an intermediate connection tab, and one end of a strap are sewn together.
Figure 5:
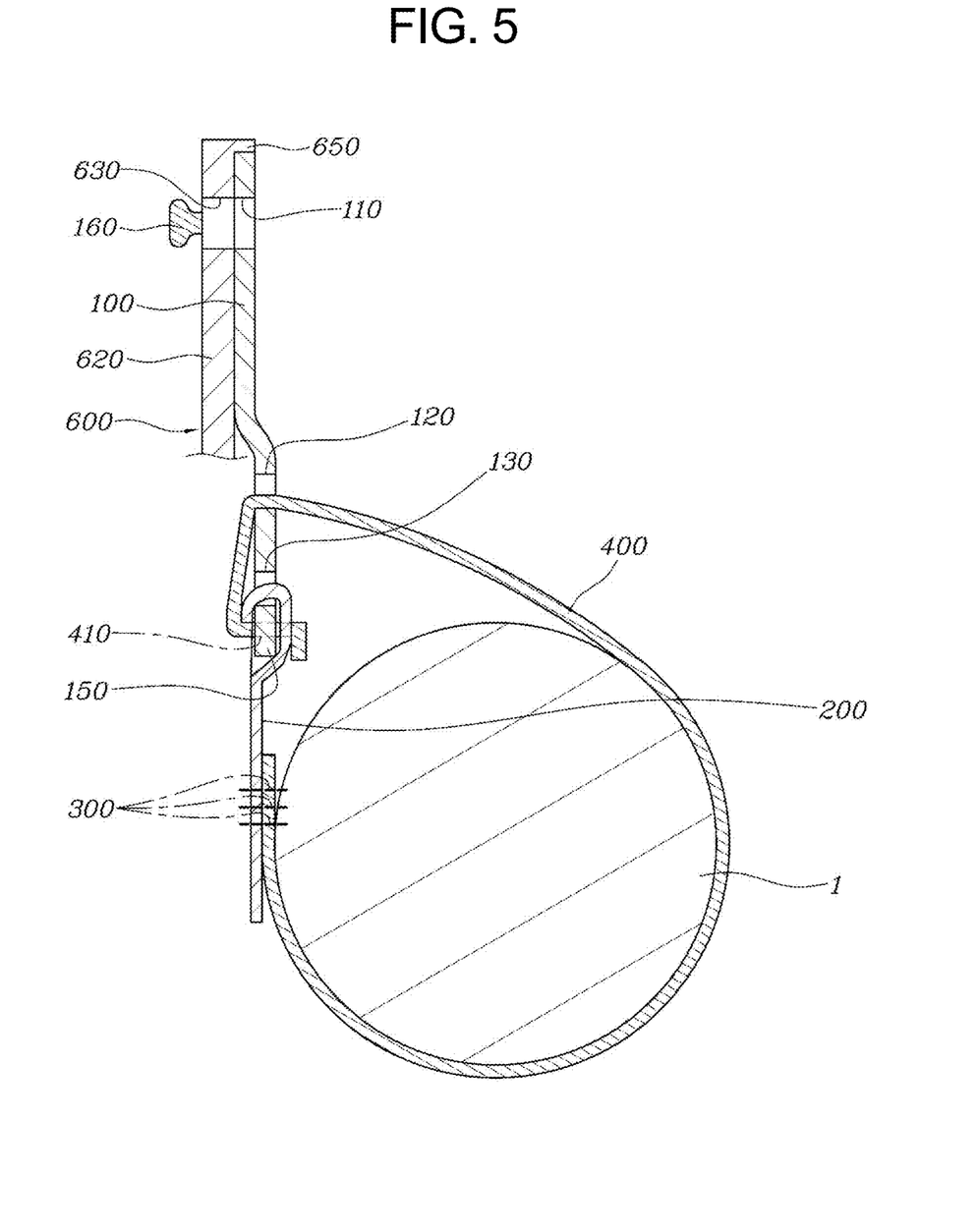
FIG. 5 is a view for explaining a state in which the strap illustrated in FIG. 4 surrounds the curtain airbag cushion, penetrates a mounting plate, and then is fixed by being caught by the mounting plate.

In the embodiment according to the present invention, as illustrated in FIGS. 3 to 5, one end of the strap 400 is sewn 300 together with the curtain airbag cushion 1 and the intermediate connection tab 200, and the other end of the strap 400 surrounds the curtain airbag cushion 1 in the circumferential direction, passes through the first through-hole 120 of the mounting plate 100, and then is fixed by being caught directly by the mounting plate 100.

To this end, catching portions 150 protrude from a lower end of the mounting plate 100, and a catching hole 410 is formed at the other end of the strap 400 so that the catching portions 150 penetrate the catching hole 410 and is caught by the catching hole 410. As the catching portions 150 and the catching hole 410 are coupled to each other, the other end of the strap 400 is fixed by being caught directly by the mounting plate 100.

One end of the strap 400 is sewn 300 together with the curtain airbag cushion 1 and the intermediate connection tab 200, and the other end of the strap 400 surrounds the curtain airbag cushion 1 in the circumferential direction, passes through the first through-hole 120 of the mounting plate 100, and then protrudes rearward from the mounting plate 100. Since the catching hole 410 is formed at the other end of the strap 400 protruding rearward from the mounting plate 100, the catching portions 150 of the mounting plate 100 are caught by the catching hole 410 of the strap 400 when the lower end of the mounting plate 100 passes through the catching hole 410. Therefore, the other end of the strap 400 is fixed by being caught by the catching portions 150 of the mounting plate 100.

Instead of the catching portions 150 protruding from the two opposite sides of the lower end of the mounting plate 100, a cut-out portion may be formed by partially cutting a rear surface of the mounting plate 100 in a 'U' shape, and the cut-out portion may serve as the same catching structure as the catching portions 150.

Figure 8:
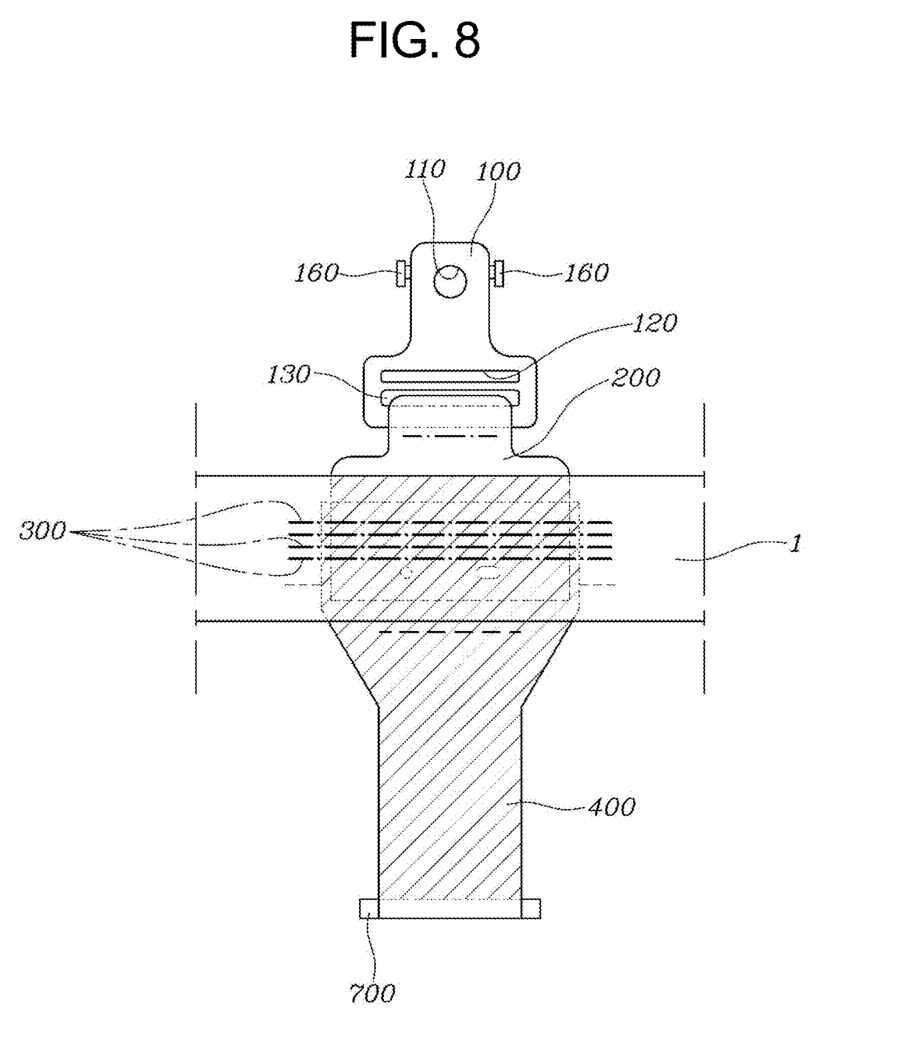
FIGS. 8 to 9 are views for explaining another embodiment according to the present invention in which a fixing member is coupled to a strap, and a curtain airbag cushion is fixed by the strap as the fixing member is fixed by being caught by a mounting plate.
Figure 9:
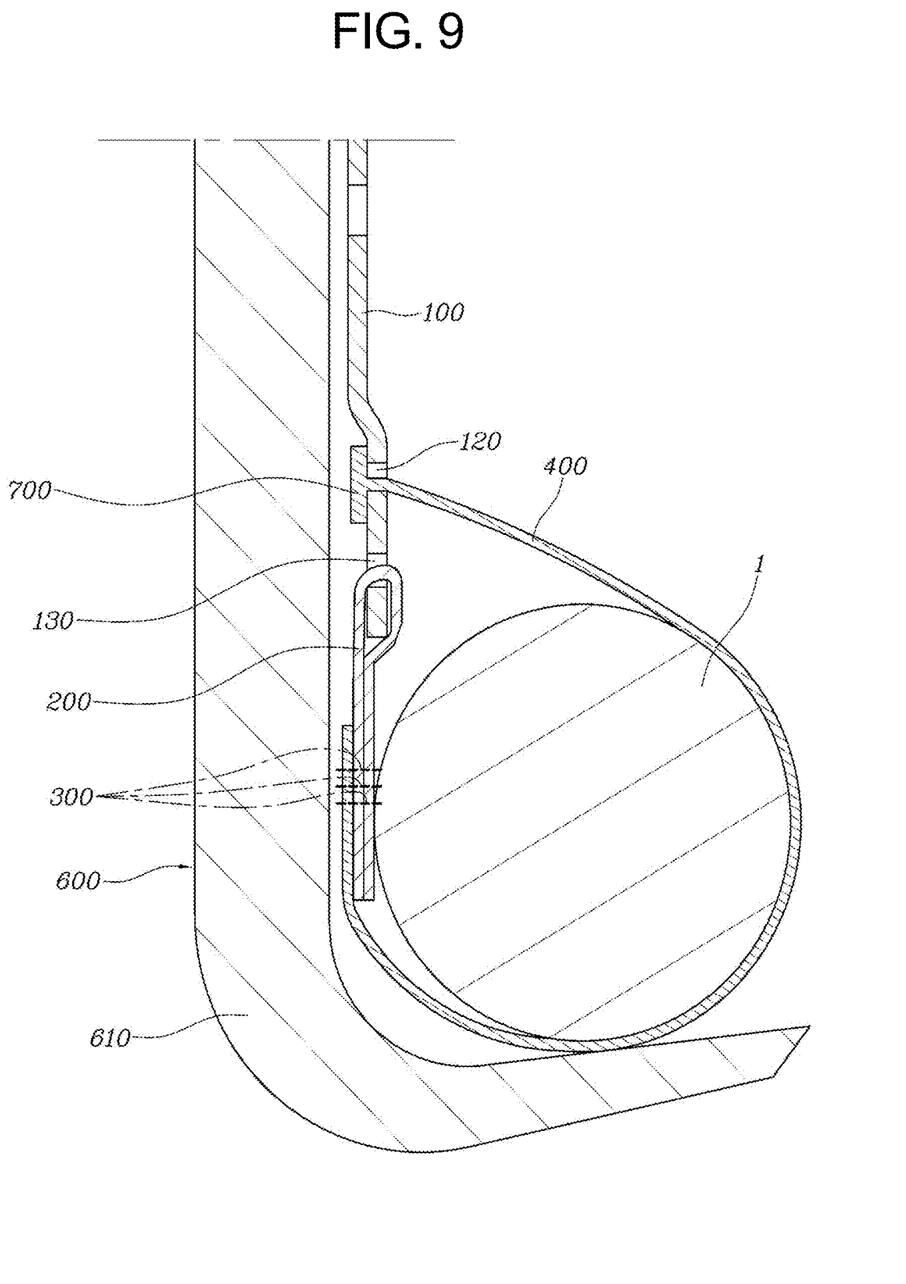

According to another embodiment of the present invention, as illustrated in FIGS. 8 to 9, a fixing member 700 may be coupled to the other end of the strap 400, and the fixing member 700 may pass through the first through-hole 120 of the mounting plate 100 and then be fixed by being caught by the rear surface of the mounting plate 100, such that the other end of the strap 400 may be connected to the mounting plate 100 by means of the fixing member 700.

The fixing member 700 has a straight rod shape and is fixedly coupled to the other end of the strap 400. When the fixing member 700 is coupled to the strap 400, the two opposite ends of the fixing member 700 protrude from the two opposite sides of the strap 400.

One end of the strap 400 is sewn 300 together with the curtain airbag cushion 1 and the intermediate connection tab 200, and the other end of the strap 400 surrounds, in the circumferential direction, the curtain airbag cushion 1 folded in a circular shape, passes through the first through-hole 120 of the mounting plate 100 together with the fixing member 700, and then protrudes rearward from the mounting plate 100.

When the fixing member 700, together with the other end of the strap 400, passes through the first through-hole 120 of the mounting plate 100 and protrudes rearward from the mounting plate 100, the strap 400 is pulled downward by a weight of the circularly folded curtain airbag cushion 1, and thus the two opposite ends of the fixing member 700 are fixed by being caught by the rear surface of the mounting plate 100, such that the circularly folded curtain airbag cushion 1 is fixed by the strap 400.

According to the present invention, a width of the fixing member 700 based on the upward/downward direction may be smaller than a width of the first through-hole 120 based on the upward/downward direction so that the fixing member 700 may pass through the first through-hole 120 of the mounting plate 100.

In addition, a length of the fixing member 700 based on a leftward/rightward direction may be longer than a length of the first through-hole 120 based on the leftward/rightward direction so that the fixing member 700 may be fixed by being caught by the rear surface of the mounting plate 100 after passing through the first through-hole 120.

In addition, according to the present invention, the fixing member 700 may have a rigid structure so that the fixing member 700 may be fixed by being caught by the rear surface of the mounting plate 100 after passing through the first through-hole 120. The rigid structure may be made of any one of steel and plastic.

Figure 6:
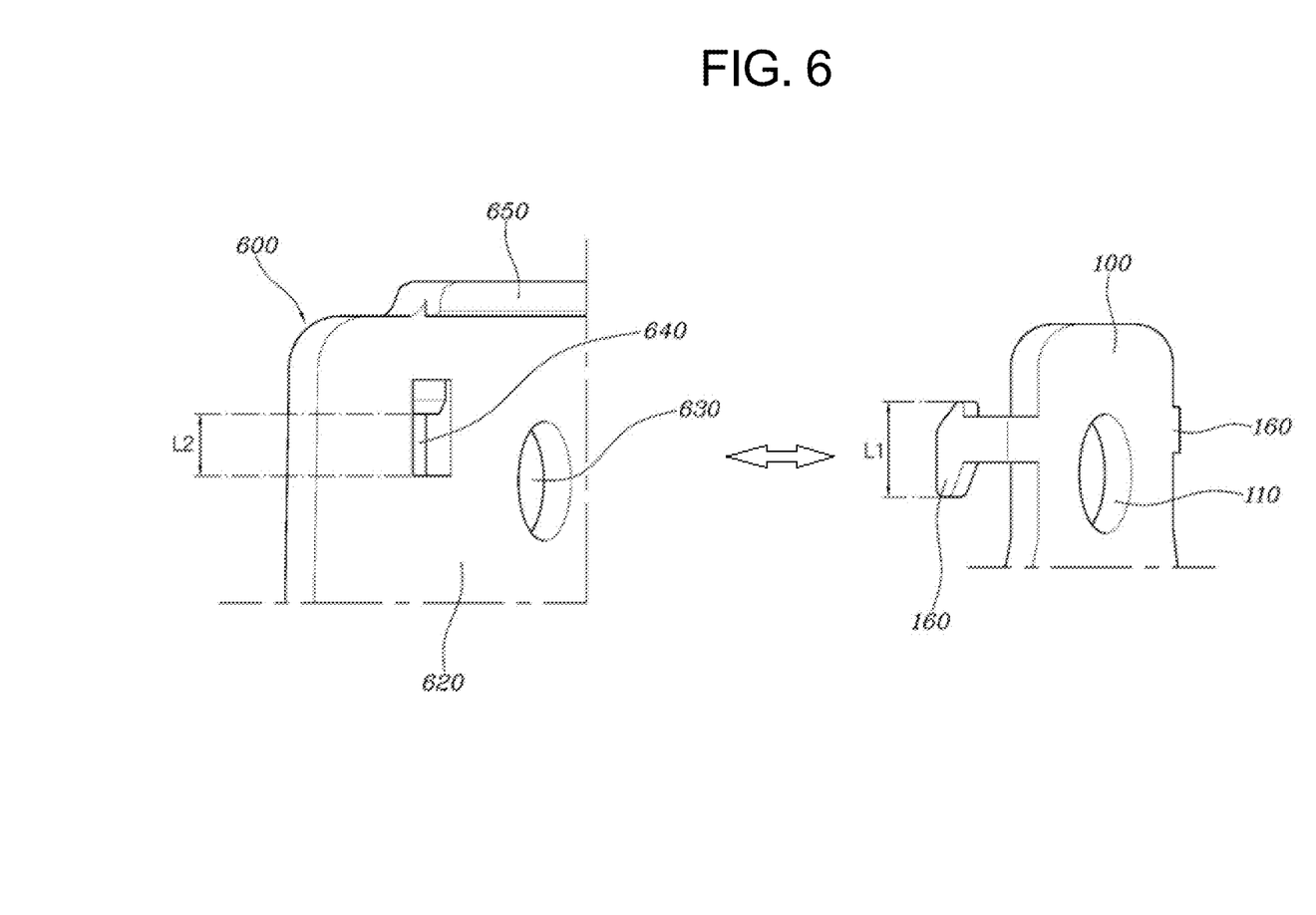
FIG. 6 is a view for explaining a hook hole formed in the ramp bracket and a coupling hook formed on the mounting plate according to the present invention.

According to the present invention, the mounting plate 100 and the ramp bracket 600 are assembled directly to each other. To this end, coupling hooks 160 are formed integrally with the mounting plate 100 and protrude toward the ramp bracket 600, and the ramp bracket 600 has hook holes 640 through which the coupling hooks 160 pass. When the coupling hooks 160 having passed through the hook holes 640 are fixed by being caught by a rear surface of the ramp bracket 600, the mounting plate 100 and the ramp bracket 600 are assembled to each other.

A length L1 of the coupling hook 160 based on the upward/downward direction may be longer in dimension than a length L2 of the hook hole 640 based on the upward/downward direction so that the coupling hook 160 may pass through the hook hole 640 and then be fixed by being caught by the rear surface of the ramp bracket 600.

Therefore, the coupling hook 160 is tilted in one direction and then passes through the hook hole 640.

As illustrated in FIGS. 3 to 6, in a case in which the coupling hooks 160 protrude from two opposite lateral surfaces of the mounting plate 100, an anti-rotation protrusion 650 formed on the ramp bracket 600 comes into contact with an upper surface of the mounting plate 100 at the time of assembling the ramp bracket 600 and the mounting plate 100. Therefore, a rotation of the mounting plate 100 is prevented as the anti-rotation protrusion 650 comes into contact with the mounting plate 100.

Figure 7:
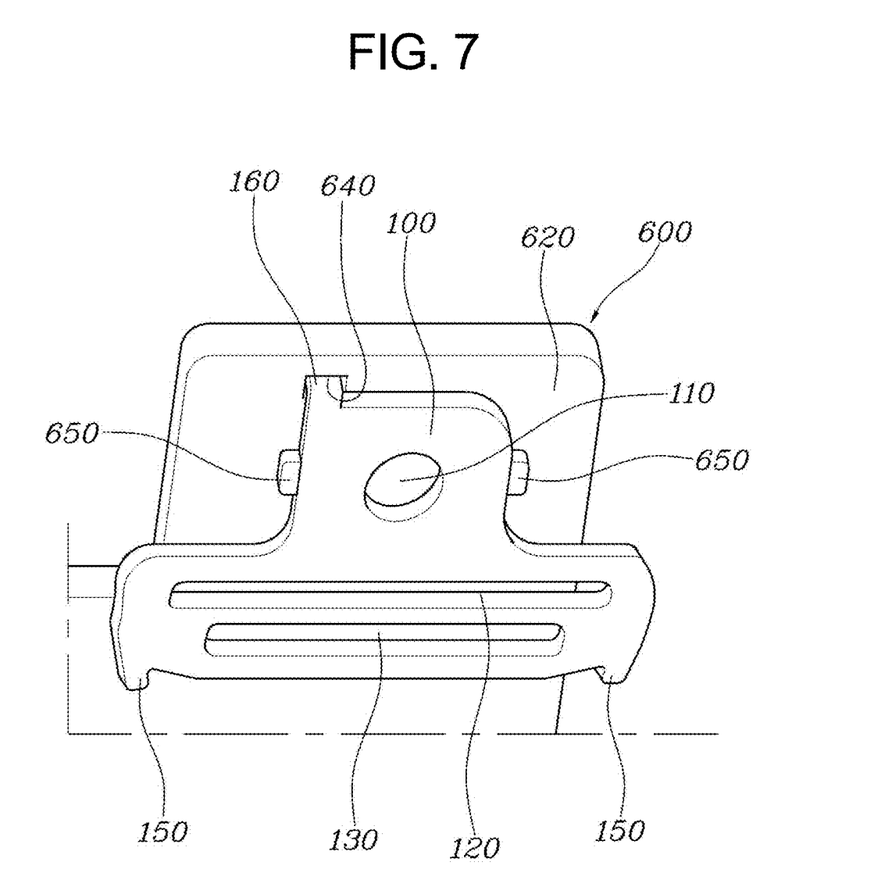
FIG. 7 is a view for explaining another embodiment of the coupling hook and an anti-rotation protrusion according to the present invention.

As another example, as illustrated in FIG. 7, in a case in which the coupling hook 160 protrudes from the upper surface of the mounting plate 100, the anti-rotation protrusions 650 formed on the ramp bracket 600 come into contact with two opposite lateral surfaces of the mounting plate 100 at the time of assembling the ramp bracket 600 and the mounting plate 100, such that the rotation of the mounting plate 100 is prevented as the anti-rotation protrusions 650 come into contact with the mounting plate 100.

As described above, the apparatus for mounting a curtain airbag cushion according to the embodiment of the present invention includes the intermediate connection tab 200 and the strap 400 sewn 300 onto the curtain airbag cushion 1, the mounting plate 100 coupled to the intermediate connection tab 200, and the ramp bracket 600 assembled with the mounting plate 100 and fixedly coupled to the vehicle body 2 together with the mounting plate 100. Further, since the mounting plate 100 is made of steel, sufficient assembly torque may be maintained when the mounting plate 100 is fixedly assembled to the vehicle body 2 by means of the bolt 500, a fastening force between the mounting plate 100 and the vehicle body 2 may be increased, thereby preventing the curtain airbag cushion 1 from separating from the vehicle body 2.

In addition, according to the present invention, since the mounting plate 100 is made of steel, the mounting plate 100 may be prevented from being sagged by the loads of the intermediate connection tab 200, the strap 400, and the curtain airbag cushion 1. Therefore, the shape of the mounting plate 100 may be maintained, which makes it possible to improve assembly properties and workability when the operator assembles the mounting plate 100 to the vehicle body 2 by using the bolt 500.

In addition, according to the present invention, the intermediate connection tab 200 and the strap 400 are made of a flexible fabric so that the intermediate connection tab 200 and the strap 400 are sewn 300 onto the curtain airbag cushion 1. Therefore, it is possible to prevent damage to the curtain airbag cushion 1 caused by the intermediate connection tab 200 and the strap 400 when the intermediate connection tab 200 and the strap 400 are sewn 300 onto the curtain airbag cushion 1.

In addition, according to the present invention, the mounting plate 100 and the ramp bracket 600 are assembled as the coupling hook 160 of the mounting plate 100 passes through the hook hole 640 of the ramp bracket 600. Therefore, it is possible to improve assembly properties and workability of the mounting plate 100 and the ramp bracket 600 and shorten a whole assembly time, thereby improving productivity.

While the specific embodiments of the present invention have been illustrated and described, it will be obvious to those skilled in the art that the present invention may be variously modified and changed without departing from the technical spirit of the present invention defined in the appended claims.

What is claimed is:

1. An apparatus for mounting a curtain airbag cushion, the apparatus comprising:
   a ramp bracket into which the curtain airbag cushion in a folded state is inserted;
   a mounting plate assembled with the ramp bracket and configured to be fixedly installed on a vehicle body together with the ramp bracket;
   an intermediate connection tab coupled to the mounting plate; and
   a strap configured to surround, in a circumferential direction, the curtain airbag cushion, the strap having one end sewn together with the curtain airbag cushion and the intermediate connection tab and a second end connected to the mounting plate and configured to fix the curtain airbag cushion;
   wherein the ramp bracket and the mounting plate are configured to be fixedly installed on the vehicle body with a bolt integrally penetrating the ramp bracket and the mounting plate, and the mounting plate is made of steel so that the mounting plate is prevented from sagging by loads of the intermediate connection tab, strap, and the curtain airbag cushion.

2. The apparatus of claim 1, wherein the second end of the strap is connected to the mounting plate as the second end penetrates the mounting plate and is fixed by being caught directly by the mounting plate.

3. The apparatus of claim 2, wherein catching portions are provided at two opposite sides of a lower end of the mounting plate, and a catching hole is formed at the second end of the strap so that the catching portions pass through the catching hole and are caught by the catching hole, and
   wherein the second end of the strap is fixed by being caught directly by the mounting plate when the catching portions are fixed to the catching hole.

4. The apparatus of claim 1, wherein a fixing member is coupled to the second end of the strap, and the second end is connected to the mounting plate by the fixing member as the fixing member penetrates the mounting plate and is fixed by being caught by the mounting plate.

5. The apparatus of claim 4, wherein the fixing member is coupled to the strap so that two opposite ends of the fixing member protrude from two opposite sides of the strap, and
   wherein the fixing member penetrates the mounting plate and is fixed when the two opposite ends of the fixing member are caught by a rear surface of the mounting plate.

6. The apparatus of claim 5, wherein the fixing member is made of any one of steel and plastic having rigidity so that the fixing member is fixed by being caught by the rear surface of the mounting plate after penetrating the mounting plate.

7. The apparatus of claim 1, wherein the mounting plate has a first through-hole through which the strap passes, and a second through-hole through which the intermediate connection tab passes, and
   wherein the first and second through-holes are spaced apart from each other in an upward/downward direction.

8. The apparatus of claim 7, wherein the intermediate connection tab is made of a flexible fabric, two opposite ends of the intermediate connection tab overlap each other after the intermediate connection tab is passed through the second through-hole of the mounting plate, and a portion of the intermediate connection tab, which is positioned below the second through-hole, is sewn together with the curtain airbag cushion and one end of the strap.

9. The apparatus of claim 7, wherein the strap is made of a flexible fabric, one end of the strap is inserted between the curtain airbag cushion and the intermediate connection tab and sewn together with the curtain airbag cushion and the intermediate connection tab, and the second end of the strap surrounds the curtain airbag cushion in the circumferential direction and is passed through the first through-hole of the mounting plate.

10. The apparatus of claim 1, wherein a coupling hook is formed integrally with the mounting plate and protrudes toward the ramp bracket, and the ramp bracket has a hook hole through which the coupling hook passes, and
  wherein the ramp bracket and the mounting plate are assembled to each other with the coupling hook having passed through the hook hole and fixed by being caught by a rear surface of the ramp bracket.

11. The apparatus of claim 10, wherein a length of the coupling hook based on an upward/downward direction is longer in dimension than a length of the hook hole based on the upward/downward direction so that the coupling hook passed through the hook hole is fixed by being caught by the rear surface of the ramp bracket.

12. The apparatus of claim 10, wherein the coupling hook protrudes from each of two opposite lateral surfaces of the mounting plate, and an anti-rotation protrusion formed on the ramp bracket is in contact with an upper surface of the mounting plate when the ramp bracket and the mounting plate are assembled such that a rotation of the mounting plate is prevented.

13. The apparatus of claim 10, wherein the coupling hook protrudes from an upper surface of the mounting plate, and anti-rotation protrusions formed on the ramp bracket are in contact with two opposite surfaces of the mounting plate when the ramp bracket and the mounting plate are assembled such that a rotation of the mounting plate is prevented.

14. An apparatus for mounting a curtain airbag cushion, the apparatus comprising:
  a ramp bracket into which a curtain airbag cushion in a folded state is inserted;
  a mounting plate assembled with the ramp bracket and configured to be fixedly installed on a vehicle body together with the ramp bracket;
  an intermediate connection tab coupled to the mounting plate; and
  a strap configured to surround, in a circumferential direction, the curtain airbag cushion, the strap having one end sewn together with the curtain airbag cushion and the intermediate connection tab and a second end connected to the mounting plate and configured to fix the curtain airbag cushion;
  wherein the mounting plate has a first through-hole through which the strap passes, and a second through-hole through which the intermediate connection tab passes, and
  wherein the first and second through-holes are spaced apart from each other in an upward/downward direction.

* * * * *